United States Patent Office 3,006,940
Patented Oct. 31, 1961

3,006,940
CYCLOPENTADIENYL METAL CARBONYL COMPOUNDS AND METHODS FOR THEIR PRODUCTION
Ernst Otto Fischer, Walter Hafner, and Hans-Otmar Stahl, Munich, Germany, assignors to Union Carbide Corporation, a corporation of New York
No Drawing. Filed Mar. 7, 1956, Ser. No. 569,975
Claims priority, application Germany Mar. 12, 1955
12 Claims. (Cl. 260—429)

This invention relates to new organo-metallic compounds and a method for their production.

It relates in particular to organic compounds of chromium, molybdenum and tungsten, in which the metal is combined at the same time with a cyclopentadienyl radical and three carbon monoxide molecules. These new organo-metallic compounds are hydrides of the general Formula I:

$$(C_5H_5)X(CO)_3H$$

in which X is a chromium, molybdenum or tungsten atom, and the salts of these compounds in which the hydrogen atom is replaced by an equivalent amount of a monovalent metal ion or of a polyvalent metal ion or of a cationic complex.

We have found that salts of the hydrides of the general Formula I, as for example the alkali metal salts, are obtained by reacting a metal derivative of cyclopentadiene, in particular an alkali metal derivative, with chromium molybdenum or tungsten carbonyl. When using cyclopentadienyl potassium and chromium hexacarbonyl, for example, as initial materials, the reaction proceeds according to the following equation:

$$C_5H_5K + Cr(CO)_6 = ((C_5H_5)Cr(CO)_3)K + 3CO$$

Instead of cyclopentadienyl potassium, there may also be used for example the corresponding lithium, rubidium, sodium, calcium, strontium or magnesium derivatives of cyclopentadiene. The reaction is preferably carried out while excluding atmospheric oxygen, in an inert solvent, such as dioxane, dimethyl formamide, ethylene glycol, monomethyl or -ethyl ether. It proceeds at ordinary or moderately elevated temperatures, as for example at 50° to 150° C., in a short time and with good yields, the amount of carbon monoxide to be expected from the above equation being evolved.

By distilling off the solvent, the salts of the new organo-metallic compounds of the general Formula I can be isolated. While air is excluded, the alkali metal salts are stable crystalline products which dissolve readily in air-free water.

By acidifying the aqueous solutions, while excluding air, with any sufficiently strong acid, such as acetic acid, hydrochloric acid, sulfuric acid, phosphoric acid, paratoluene sulfonic acid or trichloracetic acid, the free hydrides I are obtained. They are soluble in the usual organic solvents, such as ether, benzene or carbon tetrachloride, but soluble with difficulty or insoluble in air-free water; they are crystalline compounds which can be purified by sublimation in vacuo. They are stable for some time at ordinary temperature and in well closed vessels, while air and light are excluded, and dissolve in dilute aqueous caustic alkalies with the formation of the alkali metal salts which can be obtained in the purest form in this way. With many other metal ions, as for example copper, lead, thallium, cadmium or mercuric ions, or with complex cations, such as $(Co(C_5H_5)_2)^+$, they form insoluble to difficultly soluble precipitates which are often stable to air.

On standing for a longer time the hydrides I reversibly split off hydrogen, the dimeric products II being thereby formed:

$$2(C_5H_5)X(CO)_3H \rightleftharpoons H_2 + ((C_5H_5)X(CO)_3)_2$$
$$\text{I} \qquad\qquad\qquad \text{II}$$

Dimeric compounds of type II have already been prepared by Wilkinson, JACS 76 (1954), p. 209 by another procedure but their constitution was but partly recognized.

In order to accelerate the dehydrogenation and dimerization of the compounds I it is necessary to heat them, preferably in a high vacuum, the optimum heating temperatures being about 55° C. with the chromium compound and about 50° C. with the molybdenum compound whereas the tungsten compound is stable up to about 180° C. On standing on the air, all the hydrides I are dehydrogenated to form water and the dimers II. Since these dimeric products II are much more stable to air and light than the hydrides I, it is preferable to store the dimers II and to regenerate the hydrides I therefrom as and when required, for example by treatment with hydrogen at about 60 to 100° C. under a pressure of about 50 to 200 atmospheres.

The new organo-metallic compounds can be used, as antiknocks for spark ignition engines and as catalysts for organic syntheses, especially for reactions involving carbon monoxide, such as carbonylation reactions. They are further useful as reagents for analytical purposes because they give characteristic precipitates with various cations.

The following examples will further illustrate this invention but the invention is not restricted to these examples. The parts are parts by weight.

Example 1

In a stirring vessel, which is provided with a reflux condenser and an inlet pipe for nitrogen, and from which the air has been expelled by nitrogen, 44 parts of chromium hexacarbonyl and 20 parts of cyclopentadienyl potassium are dissolved in 400 to 500 parts of dimethyl formamide. The whole is gradually heated to 100° C. and finally to the boiling point. As soon as the evolution of carbon monoxide has ceased it is allowed to cool and the solvent is distilled off under greatly reduced pressure. The residue is dissolved in dilute caustic soda solution; the solution is acidified with dilute acetic acid while excluding air and cooling with ice, cyclopentadienyl chromium tricarbonyl hydride $(C_5H_5)Cr(CO)_3H$ thereby being precipitated in a good yield. It is filtered off by suction, dried at room temperature in a high vacuum and finally sublimed in a high vacuum in the usual way. It forms beautiful yellow crystals of the melting point 57 to 58° C.

Example 2

A sample of the cyclopentadienyl chromium tricarbonyl hydride prepared according to Example 1 is dissolved in dilute caustic soda solution. This solution is fairly stable in the air. To this solution there is added an aqueous solution of a mercuric salt, as for example mercuric sulfate or chloride. The mercuric salt of cyclopentadienyl chromium tricarbonyl hydride is thereby precipitated as a yellow precipitate. The product is completely stable in air and is soluble in many organic solvents, such as ether or acetone.

Example 3

An aqueous solution of dicyclopentadienyl cobaltic chloride $(Co(C_5H_5)_2)Cl$ is added to an aqueous solution of cyclopentadienyl chromium tricarbonyl sodium prepared as described in Example 1. There is thereby immediately precipitated an insoluble, violet-brown precipitate to which the following formula is attributable:

$$(Co(C_5H_5)_2)^{\oplus}((C_5H_5)Cr(CO)_3)^{\ominus}$$

Example 4

Solid yellow cyclopentadienyl chromium tricarbonyl hydride obtained by the process described in Example 1 is heated at temperatures of from about 60° to about 80° C. in a good vacuum of, say, 5 mm. Hg until no more hydrogen is split off. A blue green compound of the formula $(C_5H_5Cr(CO)_3)_2$ is obtained in an almost quantitative yield. It is only sparingly soluble in the usual solvents and can be refined by sublimation in a high vacuum at about 90 to 120° C. It melts at about 165 to 185° C. with decomposition.

Example 5

Into a pentane-hexane solution of yellow cyclopentadienyl chromium tricarbonyl hydride obtained as described in Example 1 air is introduced until in a sample of the solution no precipitate is formed any more upon addition of a drop of an alkaline solution of mercuric dicyanide. The dark colored precipitate is filtered off by suction, dried and refined by sublimation as described in Example 4, an almost quantitative yield of $(C_5H_5Cr(CO)_3)_2$ being obtained.

Example 6

The dimeric compound $(C_5H_5Cr(CO)_3)_2$ obtained by the methods described in Examples 4 or 5 is heated in a rolling autoclave at about 75° C. at a hydrogen pressure of about 80 atmospheres until no more hydrogen is consumed. An almost quantitative yield of monomeric yellow cyclopentadienyl chromium tricarbonyl hydride is obtained which can be further refined as described in Example 1.

Example 7

The vessel described in Example 1 is charged with about 500 parts of dioxane and 52 parts of molybdenum hexacarbonyl and after the air has been displaced by nitrogen, 14.4 parts of cyclopentadienyl lithium are introduced. After a short time the solution becomes brown-red in color. It is gradually heated to about 75° C., carbon monoxide thereby escaping. As soon as the evolution of gas has subsided after about 15 minutes, the whole is heated to 100° C. for 2 hours and the solvent is then distilled off under greatly reduced pressure. The dark red oily residue is dissolved in about 500 parts of air-free water. The solution is acidified with 250 parts of 2-normal acetic acid under nitrogen. The deposited pale brown precipitate is filtered off by suction while excluding air and dried in a high vacuum at room temperature for 3 hours. By sublimation in a high vacuum at about 60° C., beautiful pale yellow crystals of cyclopentadienyl molybdenum tricarbonyl hydride of the melting point 50° to 52° C. are obtained in a good yield; they gradually become red in color in the air.

Example 8

The vessel described in Example 1 is charged with 50 parts of tungsten hexacarbonyl and 400 to 500 parts of dimethyl formamide, the air is displaced by nitrogen and to the suspension, while stirring vigorously, there are added 12.5 parts of cyclopentadienyl lithium. A clear solution forms even at room temperature. This is heated at about 110° C., carbon monoxide being evolved in a short time. After heating for 2 hours at 110° C., the solvent is distilled off under greatly reduced pressure. The dark-colored oily residue is dissolved in 500 parts of air-free water; the solution is filtered if necessary and acidified under nitrogen with about 200 parts of 2-normal acetic acid. The pale brown precipitate of cyclopentadienyl tungsten tricarbonyl hydride, deposited in a good yield, is dried at room temperature in a high vacuum and finally sublimed at about 45° C. in a high vacuum. Pale yellow crystals of the melting point 65.5 to 67° C. are obtained.

Example 9

To an aqueous solution of cyclopentadienyl tungsten tricarbonyl lithium obtained by the process described in Example 7 and acidified with acetic acid the aqueous solution of any of the salts listed below is added, whereby the respective precipitate indicated with reference to any salt is formed:

Thallium chloride→$Tl(C_5H_5W(CO)_3)$, red ether-soluble
Lead acetate→$Pb(C_5H_5W(CO)_3)_2$, brown, ether-soluble
Cadmium chloride→$Cd(C_5H_5W(CO)_3)_2$, colorless, ether-soluble
Copper(II)sulfate→$Cu(C_5H_5W(CO)_3)_2$, red, ether-soluble When the following salts are used precipitates are only formed in a weakly alkaline medium:

$(Co(C_5H_5)_2)Cl \rightarrow (Co(C_5H_5)_2 \oplus (C_5H_5W(CO)_3)\ominus$, reddish-brown Tris-phenanthroline-nickel(III)bromide→
$(Ni(phen)_3)\cdot(C_5H_5W(CO)_3)_2$, reddish-brown Iron(II) and iron(III), cobalt(II) and cobalt(III), nickel and chromium ions will give no precipitates with the cyclopentadienyl tungsten tricarbonyl anion.

We claim:
1. As novel compositions of matter, organo-metallic compounds having the general formula

$$[(C_5H_5)X(CO)_3]_nZ$$

wherein $C_5H_5$ represents a cyclopentadienyl group, X represents a metal selected from the group consisting of chromium, molybdenum and tungsten, Z represents a member selected from the group consisting of hydrogen, alkali metals, and alkaline earth metals, and $n$ is an integer having a value equal to the valence of Z.
2. Cyclopentadienyl chromium tricarbonyl hydride.
3. Cyclopentadienyl molybdenum tricarbonyl hydride.
4. Cyclopentadienyl tungsten tricarbonyl hydride.
5. Cyclopentadienyl chromium tricarbonyl potassium.
6. Cyclopentadienyl molybdenum tricarbonyl sodium.
7. Cyclopentadienyl tungsten tricarbonyl lithium.
8. A process for the production of organo-metallic compounds having the general formula $$[(C_5H_5)X(CO)_3]_nZ$$

wherein $C_5H_5$ represents a cyclopentadienyl group, X represents a metal selected from the group consisting of chromium, molybdenum and tungsten, Z represents a metal selected from the group consisting of alkali metals and alkaline earth metals, and $n$ is an integer having a value equal to the valence of Z, said process comprising heating a mixture of about equimolar amounts of a cyclopentadienyl compound having the general formula $(C_5H_5)_nZ$, wherein $C_5H_5$, Z, and $n$ have the meanings defined hereinabove, and of a metal carbonyl compound having the general formula $X(CO)_6$, wherein X has the meaning defined hereinabove, in the presence of an inert oxygenated organic solvent while excluding air at temperatures of from about 50° C. to about 150° C. until the evolution of carbon monoxide substantially ceases.
9. A process for the production of organo-metallic compounds having the general formula $$(C_5H_5)X(CO)_3H$$

wherein $C_5H_5$ represents a cyclopentadienyl group, X represents a metal selected from the group consisting of chromium, molybdenum and tungsten, said process comprising reacting organo-metallic compounds having the general formula $$[(C_5H_5)X(CO)_3]_2$$

wherein $C_5H_5$ and X have the meanings defined hereinabove, with hydrogen at pressures of from about 50 atmospheres to about 200 atmospheres at temperatures of from about 60° C. to about 100° C.

10. A process for the production of organo-metallic compounds having the general formula $$[(C_5H_5)X(CO)_3]_2$$

wherein $C_5H_5$ represents a cyclopentadienyl group, X represents a metal selected from the group consisting of chromium, molybdenum and tungsten, said process comprising heating at temperatures of from about 50° C. to about 180° C. an organo-metallic hydride having the general formula $$(C_5H_5)X(CO)_3H$$

wherein $C_5H_5$ and X have the meanings defined hereinabove.

11. A process for the production of organo-metallic compounds having the general formula $$[(C_5H_5)X(CO)_3]_2$$

wherein $C_5H_5$ represents a cyclopentadienyl group, X represents a metal selected from the group consisting of chromium, molybdenum and tungsten, said process comprising heating under reduced pressure at temperatures of from about 50° C. to about 180° C. an organo-metallic hydride having the general formula $$(C_5H_5)X(CO)_3H$$

wherein $C_5H_5$ and X have the meanings defined hereinabove.

12. A process for the production of organo-metallic compounds having the general formula $$[(C_5H_5)X(CO)_3]_2$$

wherein $C_5H_5$ represents a cyclopentadienyl group, X represents a metal selected from the group consisting of chromium, molybdenum and tungsten, said process comprising dehydrogenation and dimerization of an organo-metallic hydride having the general formula $$(C_5H_5)X(CO)_3H$$

wherein $C_5H_5$ and X have the meanings defined hereinabove, by reacting said hydride with oxygen at substantially room temperature.

References Cited in the file of this patent
UNITED STATES PATENTS 2,818,416     Brown et al. _____ Dec. 31, 1957

OTHER REFERENCES

Piper et al. "Naturwissenschaften" 42, 625 (Dec. 1955).